United States Patent [19]

Bockman

[11] 3,757,021
[45] Sept. 4, 1973

[54] ARRANGEMENT FOR MEASURING THE CRATER VOLTAGES IN A THREE-PHASE ELECTRIC FURNACE WITH ELECTRODES ARRANGED IN A DELTA

[75] Inventor: Oluf Christian Bockman, Vagsbygd, Norway

[73] Assignee: Elkem-Spigerverket A/S, Oslo, Norway

[22] Filed: Oct. 20, 1972

[21] Appl. No.: 299,191

[30] Foreign Application Priority Data
Oct. 22, 1971 Norway.............................. 3919/71

[52] U.S. Cl. .................................................. 13/12
[51] Int. Cl. ........................................... H05b 7/00
[58] Field of Search................................. 13/12, 13

[56] References Cited
UNITED STATES PATENTS
3,573,336  4/1971  Ibach et al............................. 13/12
3,597,518  8/1971  Roberts.................................. 13/13

Primary Examiner—Roy N. Envall, Jr.
Attorney—William D. Lucas

[57] ABSTRACT

A plurality of measuring conductors leading from the bottom of a multi-phase electric furnace and symmetrically disposed with respect to one another and with respect to said furnace, and each connected to an associated impedance, each of said impedances having a common junction. In this fashion, cancellation of induced voltages in the measuring conductors is effected, thereby enabling generation of a potential at the common junction of the aforementioned impedances accurately representative of the potential at the bottom of the furnace. Volt meters connected from this common junction to the electrodes in the furnace can then give an accurate reading of the crater voltages.

4 Claims, 1 Drawing Figure

PATENTED SEP 4 1973
3,757,021
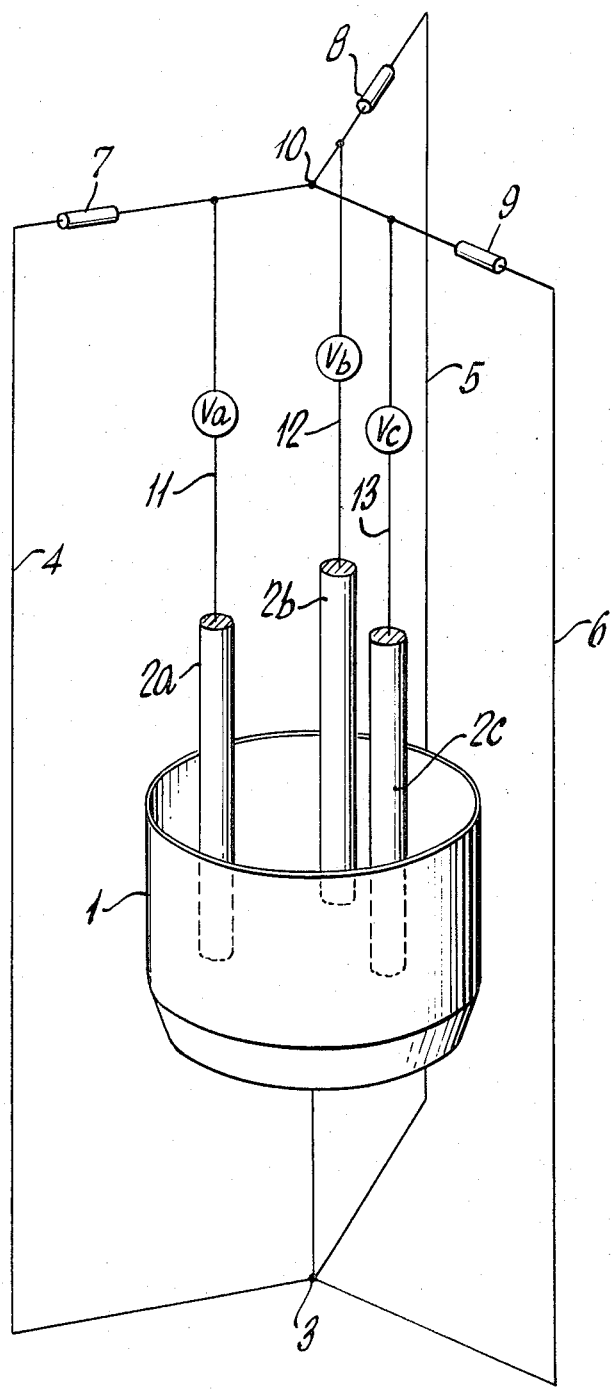

3,757,021

ARRANGEMENT FOR MEASURING THE CRATER VOLTAGES IN A THREE-PHASE ELECTRIC FURNACE WITH ELECTRODES ARRANGED IN A DELTA

BACKGROUND OF THE INVENTION

The invention relates to apparatus for measuring the crater voltages in a three-phase electric furnace with the electrodes arranged in a delta.

For optimum operation of large electric smelting furnaces, it is important to be able to measure the correct power distribution among the smelting craters beneath the electrodes. Such measurements are usually performed by measuring the electrode current and the crater voltage, i.e., the voltage between the electrode and the furnace bottom. The furnace bottom is usually equipped with a contact from which the potential of the furnace bottom is transferred to the measuring instruments in the control room by means of a conductor.

It is no problem to measure the electrode current correctly. The measurements of the crater voltages have, however, so far been uncertain due to induced voltages in the loops formed by the measuring conductors between the bottom contact and the instruments in the control room. Until now, it has not been possible to estimate the extent of these induced voltages.

The applicant has discovered an arrangement for three-phase smelting furnaces with electrodes arranged in delta which makes it possible to measure the induced voltages and to correct for them. These induced voltages can be of considerable importance as illustrated by the below example:

In a smelting furnace with electrode current 100 kA and a voltage between the electrodes of 200 V, the induced voltage was approximately 10 V. The crater reactance and resistance were about equal. At symmetrical furnace load, the power beneath each electrode would be:

$$100\ kA \times 200\ V / \sqrt{3} \times \sqrt{2} = 8.2\ MW$$

By conventional measuring arrangement and with an induced voltage of 10 V, the power measured beneath the three electrodes would be 7.5 – 9.2 – 7.9 MW, respectively. Considerably error may thus arise when measuring the power distribution. Such errors can complicate the control of operation and the adjustment of the furnace to optimum conditions.

SUMMARY OF THE INVENTION

The present invention is embodied in and carried out by voltage measurement apparatus comprising three measuring conductors connected to the furnace bottom and symmetrically disposed at substantially equal angles of about 120° in relation to each other. The conductors are preferably led, with as similar geometry as possible in relation to respective electrodes and to the adjacent structural steel parts, to a point above the furnace where the magnetic fields are weak, and are here connected through three resistances to a star connection point at which the potential of the furnace bottom is accurately reproduced. Voltmeters connected between associated electrodes and the star connection point provide crater voltage readings.

BRIEF DESCRIPTION OF THE DRAWING

The present invention may be better understood by reading the written description thereof with reference to the accompanying drawing, which is an isometric illustration of the subject voltage measuring apparatus as shown in relationship to the electric furnace and plurality of electrodes with which it is operatively associated.

DESCRIPTION OF THE PREFERRED EMBODIMENT

The furnace pot 1 holds the charge into which are inserted electrodes 2a, 2b and 2c arranged in a delta. Three measuring conductors 4, 5 and 6 are connected to the furnace bottom 3, displaced about 120° in relation to each other as projected on a horizontal plane underlying the furnace pot 1. These three conductors are, at equal distance from the furnace, led to a higher level in the furnace building and here connected through three star (wye) connected impedances 7, 8 and 9 to a common star connection point 10. These impedances are preferably resistances, but may be any impedance unit or other components suitable for combining the potentials appearing at the three conductor ends at the star connection point 10.

The three conductors 4, 5 and 6 are arranged as identically as possible in relation to respective electrodes and also in relation to neighbouring structural steel parts, which can deform the field and thus influence induced voltages.

When the three measuring conductors 4, 5 and 6 are arranged identically, and the three electrode currents are of equal magnitude, the induced voltages in the three measuring conductors will be equal. These induced voltages are, however, displaced from one another by a phase angle of about 120°. By connecting the conductors 4, 5 and 6 through three equal resistances 7, 8 and 9 joined in a star connection, the potential of the furnace bottom will be reproduced at the star connection point 10.

When the star connection point 10 and the control room are situated in an area with weak fields, no substantial voltage is induced in the conductors leading from the star-connected resistances 7, 8 and 9 to the control room. Induction errors in crater voltage readings, if any, may be further minimized by common wiring of all connectors to the voltmeters Va, Vb and Vc from the control room to the star connection point 10, the connectors 11, 12 and 13 being extended the short distances from the star connection point 10 to the electrode casing or electrode holder of electrodes 2a, 2b and 2c for transmitting the respective electrode potentials to the voltmeters in the control room.

The three measuring conductors 4, 5 and 6 can be arranged at any angle in relation to the electrodes 2a, 2b and 2c. The magnetic fields are somewhat weaker between the electrodes than adjacent the electrodes. However, the applicant has found that it is advantageous to arrange the conductors adjacent the three electrodes, if possible. The induced voltage in one measuring conductor will then be dominated by the current in the adjacent electrode, resulting in induced voltages in the measuring conductors which are proportional to the respective electrode currents. By connecting the conductors 4, 5 and 6 through three equal resistances 7, 8 and 9 to a star connection point 10, the potential of the furnace bottom will be accurately reproduced at the star connection point 10, even at different electrode currents.

Practical obstacles can make it difficult to dispose the three measuring conductors identically. The applicant has found that when two of the measuring conductors are led identically, while the third one is led differently for practical reasons, the potential of the furnace bottom can nevertheless be reproduced at the star connection point 10 by employing an asymmetrical star connection. The potential appearing at the ends of the three measuring conductors 4, 5 and 6 at the star connection point 10 will form, at equal electrode currents, an assymmetrical triangle instead of an equilateral triangle. The potentials appearing at the ends of the two identical conductors 4 and 5 at the star connection point 10 constitute, however, two of the corners of the equilateral vector triangle which is formed when the three conductors 4, 5 and 6 are identical. The third corner can then be found, and the values of the impedances 7, 8 and 9 be selected in such a manner that the star connection point 10 is located in the center of the said equilateral triangle. The asymmetrical values of the star-connected impedances 7, 8 and 9 thus chosen will accurately reproduce the furnace bottom potential at the star connection point 10.

The advantages of the present invention, as well as certain changes and modifications of the disclosed embodiment thereof, will be readily apparent to those skilled in the art. It is the applicant's intention to cover all those changes and modifications which could be made to the embodiment of the invention herein chosen for the purposes of the disclosure without departing from the spirit and scope of the invention.

The embodiment of the invention in which an exclusive property or privilege is claimed is defined as follows:

1. Apparatus for measuring the crater voltages in a three-phase electric smelting furnace with three electrodes arranged in a delta, comprising:
   1. first, second and third measuring conductors which are displaced about 120° in relation to each other and which lead from the furnace bottom to a point above the furnace;
   2. first, second and third impedances in a star connection, said impedances being respectively connected to said first, second and third measuring conductors to reproduce the potential at the furnace bottom; and
   3. first, second and third voltage measuring means connected between associated electrodes and the common point of said star connection.

2. Apparatus according to claim 1 wherein said first, second and third measuring conductors are led adjacent first, second and third electrodes, respectively.

3. Apparatus according to claim 1 wherein said star connection is symmetrical when the three measuring conductors are arranged in an identical way.

4. Apparatus according to claim 1, wherein said star connection is asymmetrical when two of the measuring conductors are led in an identical path, and the third measuring conductor is led in a different path.

* * * * *